July 28, 1925.                                                    1,547,889
C. WASEIGE
VEHICLE BRAKE
Filed June 11, 1923

INVENTOR
Charles Waseige
by O'Neill Bunn
Attys.

Patented July 28, 1925.

1,547,889

UNITED STATES PATENT OFFICE.

CHARLES WASEIGE, OF BILLANCOURT, FRANCE, ASSIGNOR TO SOCIÉTÉ DES AEROPLANES H. & M. FARMAN, OF BILLANCOURT, SEINE, FRANCE, A CORPORATION OF FRANCE.

VEHICLE BRAKE.

Application filed June 11, 1923. Serial No. 644,664.

*To all whom it may concern:*

Be it known that I, CHARLES WASEIGE, engineer, citizen of the French Republic, residing at Billancourt, Department of the Seine, in France, and having P. O. address 149 Rue de Silly, in the said city, have invented certain new and useful Improvements in or Relating to Vehicle Brakes; and I do hereby declare the following to be a full, clear, and exact description of the invention, such as will enable others skilled in the art to which it appertains to make and use the same.

This invention relates to brakes, and is illustrated as embodied in an automobile brake of a type in which the braking friction is utilized as a brake-applying force.

The principal features of the invention relate to a novel device for taking the braking torque, which is hollow and which serves to house the brake-applying means, and to a novel arrangement in which successive action of the brake shoes or the like is insured, preferably by springs, while the brake-applying means is entirely relieved of the braking torque. If desired, the shoe or equivalent friction member may directly engage the hollow torque-taking device, and in the drawings the friction member is shown directly pivoted thereon.

An illustrated novel four-wheel brake system and a modified brake shown in the drawings are covered by my divisional application No. 27,468, filed May 2, 1925.

The invention is illustrated in the accompanying drawings in which.

Referring to the first improvement over the arrangement shown in my earlier application No. 443,556, filed February 1, 1921, it has been found necessary to separate the spindle of the cam or other brake-operating means from the fixed spindle about which move the coupled segments constituting the jaws or shoes, in order to avoid jamming due to the reaction of braking on the said fixed point, and thus to allow of a prompt return of the cam as soon as the brake control is released.

Figure 2:
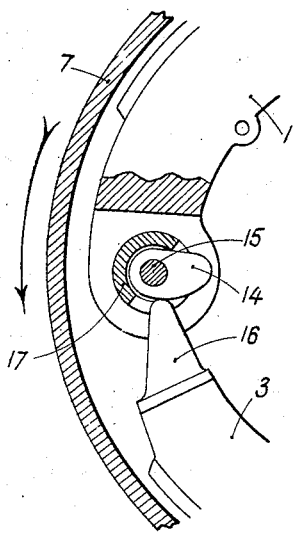

In order to obtain this result, a certain play may be left between the two spindles 15 and 17, Figure 2, when they are concentric, the spindle 15 being that to which the cam is secured; or, the fixed spindle 17 may be secured fairly close to the spindle 15 of the cam 14.

Figure 1:
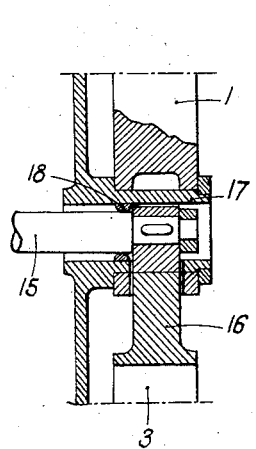
Figures 1 and 2 are sections of the modified parts of the cams.

The first arrangement is illustrated in Figures 1 and 2; in which the friction members are illustrated as novel hinged shoes 1, 3, operated in the same manner as set forth in the specification of the earlier above patent application, i. e. by means of the cam 14, but the fixed spindle 17 about which the shoe 1 turns, is concentric with, and independent of, the spindle 15 secured to the cam 14. Moreover the bearing 18 of the spindle 15 has a rounded off section giving it the minimum bearing surface. It will be observed that spindle 17 serves as a hollow torque-taking or anchor member engaged by the friction member 1, which in the illustrated instance is pivoted on it, and that this hollow anchor serves to house the brake applying means, which may be the illustrated cam or other expanding device, and which operates on the brake through an opening in the side of the hollow anchor.

It follows that in this arrangement any bending of the spindle 17 due to the reactions of braking, has no material effect on the spindle 15 of the cam 14. Moreover the spindle or hollow anchor serves as a convenient mounting for the brake-applying device.

Figure 3:
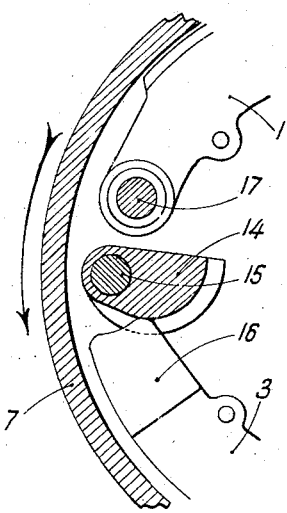
Figure 3 is a modification of the arrangement shown in Figure 2.

In the second arrangement Figure 3, the spindle 17 is mounted as close to the spindle 15 as possible, without however the said spindles coming into contact with each other. In this case, as in the former case, the braking reaction has no influence on the spindle 15 of the cam.

In the case of four-wheel braking, it is known that the braking effect on the rear axle should be less efficient than on the front axle, owing to the shifting of the centre of gravity of the vehicle in the direction of its travel during the slowing down, in order to avoid slipping or skidding of the rear wheels, which causes abnormal wear on the tires and retards the rapidity of stopping.

Figure 4:
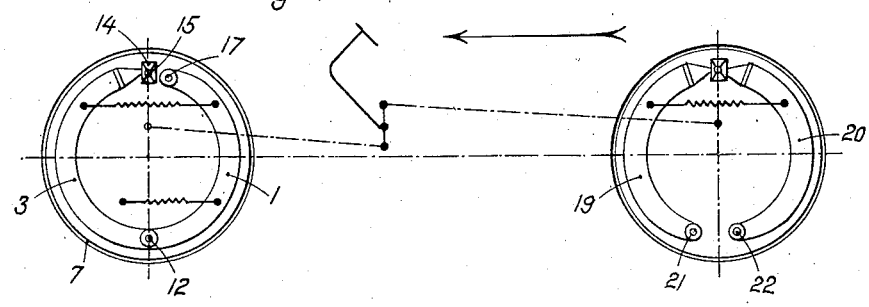
Figure 4 shows an adaptation of the invention for applying the brake to four wheels.

The object of the arrangement shown in Figure 4 is to meet this condition.

In the said figure, the front axle is provided with the brake according to the invention described in the above patent application, and the rear axle is provided with an ordinary brake having two shoes 19 and 20 each pivoted about a fixed point 21 and 22.

When the brake is applied whilst travelling in the forward direction, the front axle will be more loaded than the rear one, and its brake will act as a self energizing brake, that is to say with all the advantages of a servo-brake. The rear axle will be braked by the ordinary brake.

On the other hand, this combination of a self energizing brake at the front, with an ordinary brake at the back, will make possible a braking during backward running, which is more powerful than that obtained by the self energizing system at the front and at the back, the direction of rotation of the drums being opposite to the development of the segments or shoes.

Claims.

1. In combination with a drum, a brake therefor comprising a plurality of articulated brake shoes, a fixed anchorage for one end of the brake and operating means acting on the other end of the brake to move said brake shoe into contact with the drum, at least a part of said operating means being carried by said fixed anchorage.

2. In combination with a drum, a brake therefor comprising a plurality of articulated brake shoes, a fixed anchorage for one end of the brake and operating means acting on the other end of the brake to move said brake shoes into contact with the drum, at least a part of said operating means being carried by and within a hollow part of said fixed anchorage.

3. In combination with a drum, a brake therefor comprising primary and secondary shoes independently jointed together, a fixed anchorage for one end of the secondary shoe, an operating member carrying means for engaging the open end of said primary shoe, said operating member being supported by said anchorage.

4. In combination with a drum, a brake therefor comprising primary and secondary shoes independently jointed together, a fixed anchorage for one end of the secondary shoe, an operating member carrying means for engaging the open end of said primary shoe, said operating member having a bearing support within said anchorage.

5. In combination with a rotatable member, an internal brake therefor comprising a plurality of articulated shoes, a fixed hollow spindle pivotally supporting one end of the brake, an operating spindle positioned within said hollow spindle and means carried by said operating spindle for acting on the other end of said brake as and for the purpose described.

6. In combination with a rotatable member, an internal brake therefor comprising a plurality of articulated shoes, a pair of concentrically arranged spindles, the outer one acting as a support for one end of the brake and the other carrying means for acting on the other end of said brake as and for the purposes described.

7. In combination with a rotatable member, an internal brake therefor comprising a plurality of articulated shoes, a pair of concentrically arranged spindles, the outer one being fixed and acting as a pivot for one end of the brake, the other spindle being rotatable and carrying means for acting on the other end of said brake as and for the purposes described.

8. In combination with a drum, a brake therefor comprising a plurality of articulated brake shoes, a fixed anchorage for one end of the brake and operating means acting on the other end of the brake to move said brake shoes into contact with the drum, at least a part of said operating means being carried by said fixed anchorage, and means for laterally guiding the end of the brake which is acted on by said operating means.

9. In brake mechanism, including a rotatable member to be braked, a brake shoe with means for moving it into engagement with said rotatable member and another shoe having one end pivoted and the other end moved through the movement of the first shoe, the pivot for said shoe end being concentrically arranged with respect to at least a part of said moving means.

10. In a self energizing brake comprising a plurality of articulated shoes, said brake having one end movable on a relatively fixed anchorage and the other end free to be moved, operating means supported on said anchorage and acting on said free brake end to move the same and means for taking the thrust of the brake at its anchorage away from said operating means consisting of two concentrically arranged but independent bearings in said anchorage.

11. A brake comprising, in combination, one or more shoes, a hollow spindle having a slot in its side, a spindle within and coaxial with respect to the hollow spindle, and an operating member turned by the inner spindle and extending through said slot and arranged to operate the shoes.

12. A brake comprising, in combination, a drum, expansible brake means within the drum, a hollow anchor member arranged to take the torque from said brake means, and means housed within the hollow anchor member and operative to expand the brake means.

13. A brake comprising, in combination, a drum, expansible brake means within the drum, a hollow anchor member having an opening in its side and arranged to take the torque from said brake means, and an expanding device housed within the hollow anchor member and operative through the opening to expand the brake means.

14. A brake comprising, in combination, a drum, friction means engageable with the drum, a hollow generally cylindrical anchor member arranged to take the torque of said means and provided with an opening, and a brake-applying device within the hollow anchor member and acting on the friction means through the opening.

15. A brake comprising, in combination, a drum, friction means engageable with the drum, a hollow generally cylindrical anchor member fixed at one end and arranged to take the torque of said means and provided with an opening, and a brake-applying device entering said hollow anchor member at its fixed end and acting on the friction means through the opening.

16. A brake comprising, in combination, a drum, an expansible friction device within the drum having its ends adjacent each other, a hollow anchor member arranged to take the braking torque from the end of said friction device, and an expanding device housed within the hollow anchor member and operatively engaging the other end of said device.

17. A brake comprising, in combination, a drum, an expansible friction device within the drum having its ends adjacent each other, a hollow anchor member fixed at one end and open at the fixed end and arranged to take the braking torque from said friction device, an expanding device operatively engaging said friction device, and means extending into the open fixed end of the hollow anchor member and arranged to operate the expanding device.

18. A brake comprising, in combination, a drum, expansible friction means within the drum, a hollow member fixed at one end and open at its fixed end and having its free end projecting within the drum and having an opening in its side, means acting through the opening to expand the friction means, and a part extending into said hollow member through the open fixed end and arranged to operate the expanding means.

19. A brake comprising, in combination, a drum, connected shoes within the drum so arranged that one shoe is moved by the friction of the drum to apply the other, a torque-taking device engaged by one end of the shoes, and a device for expanding the shoes, the torque-taking device being formed and arranged to protect the expanding device.

20. A brake comprising, in combination, a drum, a pair of connected shoes within the drum, an anchor for one end of the connected shoes, expanding means for forcing the opposite end of the connected shoes against the drum, and a spring arranged to hold the anchored shoe away from the drum until the unanchored shoe engages the drum and is moved with the drum to overcome the spring, the anchor being separate from the expanding means.

In testimony whereof I affix my signature.

CHARLES WASEIGE.